(12) United States Patent
Yuan et al.

(10) Patent No.: US 10,639,843 B2
(45) Date of Patent: May 5, 2020

(54) ENHANCED DIGITAL LIGHT PROCESSING-BASED MASK PROJECTION STEREOLITHOGRAPHY METHOD AND APPARATUS

(71) Applicant: HAN'S LASER TECHNOLOGY INDUSTRY GROUP CO., LTD., Shenzhen, Guangdong (CN)

(72) Inventors: Jian Yuan, Guangdong (CN); Xilu Li, Guangdong (CN); Yangting Qi, Guangdong (CN); Hao Yang, Guangdong (CN); Yunfeng Gao, Guangdong (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 242 days.

(21) Appl. No.: 15/666,527

(22) Filed: Aug. 1, 2017

(65) Prior Publication Data

US 2017/0326786 A1 Nov. 16, 2017

Related U.S. Application Data

(63) Continuation of application No. PCT/CN2016/112616, filed on Dec. 28, 2016.

(30) Foreign Application Priority Data

Dec. 30, 2015 (CN) .......................... 2015 1 1020004

(51) Int. Cl.
*B29C 64/129* (2017.01)
*B29C 64/135* (2017.01)
(Continued)

(52) U.S. Cl.
CPC ........ *B29C 64/129* (2017.08); *B29C 35/0805* (2013.01); *B29C 64/135* (2017.08);
(Continued)

(58) Field of Classification Search
CPC . B29C 64/129; B29C 64/393; B29C 35/0805; B33Y 10/00
See application file for complete search history.

(56) References Cited

U.S. PATENT DOCUMENTS

| 7,910,869 | B2* | 3/2011 | Seo | .......... B23K 26/38 |
| | | | | 250/201.9 |
| 2011/0101570 | A1* | 5/2011 | John | ...................... G03F 7/0037 |
| | | | | 264/401 |

FOREIGN PATENT DOCUMENTS

| CN | 101244629 A | 8/2008 |
| CN | 104142574 A | 11/2014 |
| CN | 105665701 A | 6/2016 |

OTHER PUBLICATIONS

International Search Report of PCT Patent Application No. PCT/CN2016/112616 dated Mar. 17, 2017.

* cited by examiner

*Primary Examiner* — Kelly M Gambetta

(57) ABSTRACT

An enhanced digital light processing-based mask projection stereolithography method and apparatus are disclosed, where the apparatus comprises: a control platform capable of slicing a model of a to-be-prototyped object into layers, converting the layer into a bitmap, and further dividing the layer into a main body area and boundary filling areas; a digital light processing unit that is controlled by the control platform and capable of emitting a first light beam used for the corresponding main body area of the layer of the to-be-prototyped object; and a laser marking unit that is controlled by the control platform and capable of emitting a (Continued)

second light beam used for the corresponding boundary filling areas of the layer of the to-be-prototyped object. The present invention can not only implement high-speed prototyping but also avoid an edge distortion, thereby improving precision of object prototyping.

4 Claims, 2 Drawing Sheets

(51) Int. Cl.
*B29C 64/268* (2017.01)
*B33Y 10/00* (2015.01)
*B29C 64/393* (2017.01)
*B29C 35/08* (2006.01)
*B33Y 30/00* (2015.01)
*B33Y 40/00* (2020.01)
*B33Y 50/02* (2015.01)
*B29K 105/00* (2006.01)

(52) U.S. Cl.
CPC .......... *B29C 64/268* (2017.08); *B29C 64/393* (2017.08); *B33Y 10/00* (2014.12); *B33Y 30/00* (2014.12); *B33Y 40/00* (2014.12); *B33Y 50/02* (2014.12); *B29C 2035/0838* (2013.01); *B29K 2105/0058* (2013.01)

ENHANCED DIGITAL LIGHT PROCESSING-BASED MASK PROJECTION STEREOLITHOGRAPHY METHOD AND APPARATUS

CROSS-REFERENCE TO RELATED APPLICATION

This application is a continuation application of PCT Application No. PCT/CN2016/112616 filed on Dec. 28, 2016, which claims priority to Chinese Application No. 201511020004.7 filed on Dec. 30, 2015, the entire contents of which are hereby incorporated by reference.

TECHNICAL FIELD

The present invention relates to rapid prototyping technologies, and in particular, to high-precision rapid prototyping technologies.

BACKGROUND

Existing rapid prototyping technologies for light curing resins mainly comprise SLA (stereolithography apparatus) and DLP (Digital Light Processing, digital light processing technology). The DLP rapid prototyping technology uses simple equipment and is much faster in prototyping than the SLA rapid prototyping technology; therefore, the DLP rapid prototyping technology becomes more popular in the market. In addition, the DLP-based mask projection stereolithography technology features high precision, especially applicable to such fields as lost-wax casting of metal jewelry. However, a projected image of the DLP-based mask projection stereolithography is a bitmap converted from a vector diagram. Referring to FIG. 1, a vector section of a three-dimensional model is a circle in this example and is converted into a bitmap 10 composed of a great quantity of pixels. In addition to a main body area 101, a boundary area 102 not belonging to the vector section is comprised in the bitmap during a conversion process while a boundary area 103 belonging to the vector section is excluded. In this case, a DLP mask projection area is different from a three-dimensional model vector section area, resulting in deformation of a prototyped object to some extent. For a small-size three-dimensional object, an edge distortion of a bitmap means a greater edge distortion of a vector section, thereby affecting precision of object prototyping.

SUMMARY

A technical issue to be resolved by the present invention is to provide an enhanced digital light processing-based mask projection stereolithography technology to prevent the foregoing prior-art defects. This can not only implement high-speed prototyping but also avoid an edge distortion, thereby improving precision of object prototyping.

To resolve the foregoing technical issue, the present invention provides an enhanced digital light processing-based mask projection stereolithography apparatus, comprising: a control platform capable of slicing a model of a to-be-prototyped object into layers, converting the layer into a bitmap, and further dividing the layer into a main body area and boundary filling areas; a digital light processing unit that is controlled by the control platform and capable of emitting a first light beam used for the corresponding main body area of the layer of the to-be-prototyped object; and a laser marking unit that is controlled by the control platform and capable of emitting a second light beam used for the corresponding boundary filling areas of the layer of the to-be-prototyped object.

Further, an optical axis of the first light beam is coaxial with an optical axis of the second light beam.

Further, prototyping the main body area by the digital light processing unit and prototyping the boundary filling areas by the laser marking unit are performed simultaneously.

Further, the apparatus further comprises a dichroic mirror, where the first light beam enters at an angle of 45 degrees to a first face of the dichroic mirror and is reflected to a first specified processing position, and the second light beam enters a second face of the dichroic mirror, penetrates the first face, and reaches a second specified processing position.

Further, the apparatus further comprises: a prototyping platform and a liquid resin tank which is defined on the prototyping platform, where both the first specified processing position and the second specified processing position are located in the liquid resin tank.

Further, the first specified processing position is corresponding to the main body area, and the second specified processing position is corresponding to the boundary filling areas.

Further, the prototyping platform comprises a platform body and a moving mechanism that is configured to drive the platform body to move along a vertical axis.

Further, the laser marking unit comprises a laser, and the laser is an ultraviolet laser.

To resolve the foregoing technical issue, the present invention also provides an enhanced digital light processing-based mask projection stereolithography method, comprising the following steps:

slicing a model of a to-be-prototyped object into layers, converting the layer into a bitmap, and further dividing the layer into a main body area and boundary filling areas;

prototyping, by using a digital light processing unit, the corresponding main body area of the layer of the to-be-prototyped object; and prototyping, by using a laser marking unit, the corresponding boundary filling areas of the layer of the to-be-prototyped object.

Further, the steps of slicing a model of a to-be-prototyped object into layers, converting the layer into a bitmap, and further dividing the layer into a main body area and boundary filling areas comprises:

performing lamination and slicing processing on a three-dimensional model of the to-be-prototyped object to obtain a series of vector sections composed of closed loops;

mapping the vector sections to an image area of a corresponding resolution of the digital light processing unit, and converting pixels located inside the closed loops into a bitmap, namely, the main body area; and recording coordinates of a pixel intersecting with a boundary of the closed loop and an intersecting point between the pixel and the boundary of the closed loop to obtain the boundary filling areas.

Further, prototyping the main body area by the digital light processing unit and prototyping the boundary filling areas by the laser marking unit are performed simultaneously.

Further, the prototyping the corresponding boundary filling areas of the layer of the to-be-prototyped object by the laser marking unit comprises: scanning filling lines inside the boundary filling areas and scanning contours of the boundary filling areas.

Further, when a projection resolution of the digital light processing unit makes a corresponding size of the pixel smaller than a spot of the second light beam emitted by the laser marking unit, the prototyping the corresponding boundary filling areas of the layer of the to-be-prototyped object by the laser marking unit merely refers to scanning the contours of the boundary filling areas.

A beneficial effect of the present invention lies in that: a layer is divided into a main body area and boundary filling areas; the DLP technology is combined with the laser marking technology; and the boundary filling areas are prototyped by the laser marking unit at the same time when the main body area is prototyped by the DLP unit. Therefore, not only high-speed prototyping is implemented, but also an edge distortion is avoided, thereby improving precision of object prototyping.

BRIEF DESCRIPTION OF DRAWINGS

The present invention is further described with reference to the embodiments and the accompany drawings in which.

Figure 1:
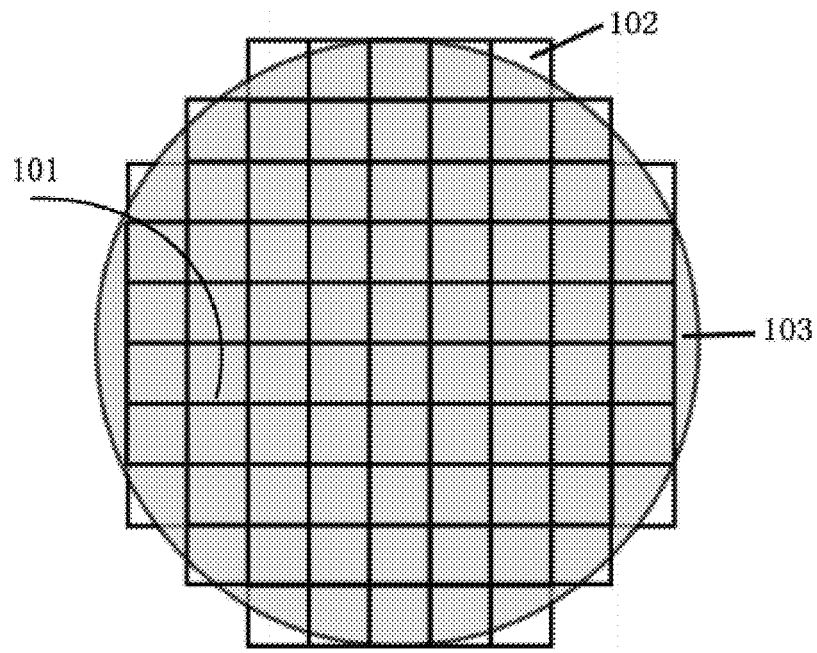
FIG. 1 is a schematic diagram of a bitmap of an edge-distorted layer in the prior art.

Herein, reference numerals of the accompanying drawings are as follows: 20 apparatus; 201 prototyping platform; 202 liquid resin tank; 203 digital light processing unit; 204 dichroic mirror; 205 laser marking unit; 206 control platform; 207 communications line; 208 first light beam; 209 second light beam; 2051 laser; 2052 XY scanner; 2053 lens; 2071 first cable; 2072 second cable; 2073 third cable; 10 bitmap of a layer; 101 main body area; 102; 103 boundary areas; 30 corresponding image of a layer; 301 main body area; 305, 306, 307, 308 boundary filling areas.

DESCRIPTION OF EMBODIMENTS

Herein, exemplary embodiments of the present invention are described in detail with reference to the accompanying drawings.

The present invention provides an enhanced digital light processing-based mask projection stereolithography method, comprising the following steps: slicing a model of a to-be-prototyped object into layers, converting a layer into a bitmap, and further dividing the layer into a main body area and boundary filling areas; prototyping, by using a digital light processing unit, the corresponding main body area of the layer of the to-be-prototyped object; and prototyping, by using a laser marking unit, the corresponding boundary filling areas of the layer of the to-be-prototyped object. Preferably, prototyping the main body area by the digital light processing unit and prototyping the boundary filling areas by the laser marking unit are performed simultaneously. Preferably, boundary filling areas of a corresponding image of the layer of the object are divided in an upper-lower direction and the both-side direction, where the upper and lower boundary filling areas are filled in a vertical scanning mode, and the boundary filling areas on both sides are filled in a horizontal scanning mode. The to-be-prototyped object is applicable to a model for a lost wax casting process, or any other three-dimensional models.

Figure 2:
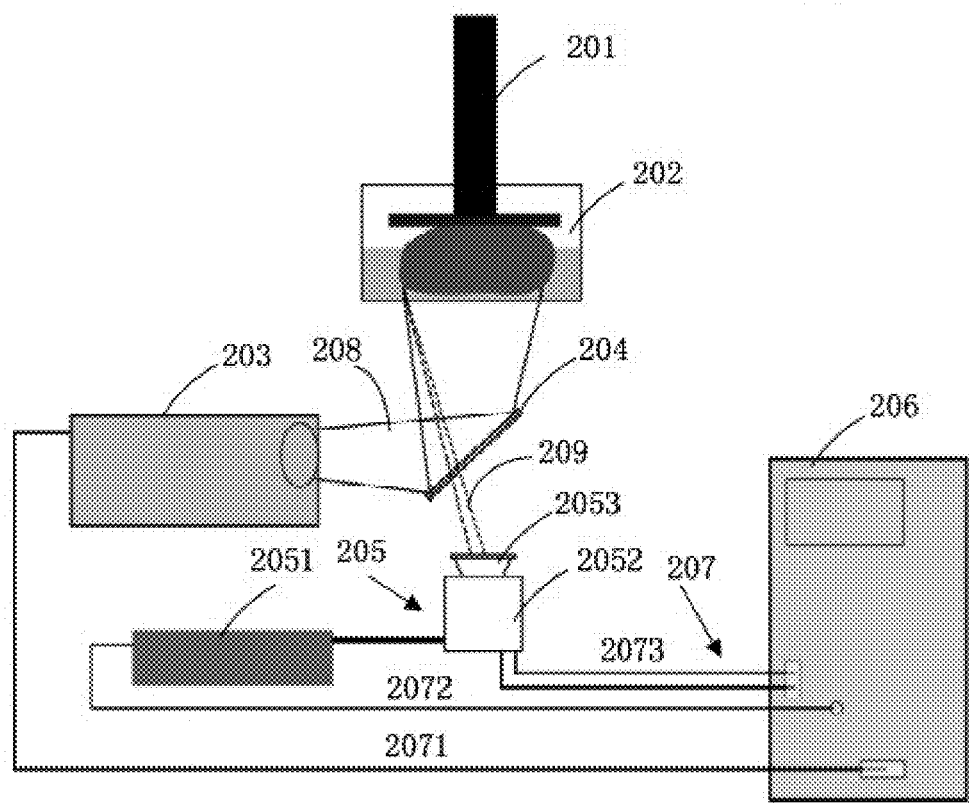
FIG. 2 is a schematic structural diagram of an enhanced digital light processing-based mask projection stereolithography apparatus according to the present invention.
Figure 3:
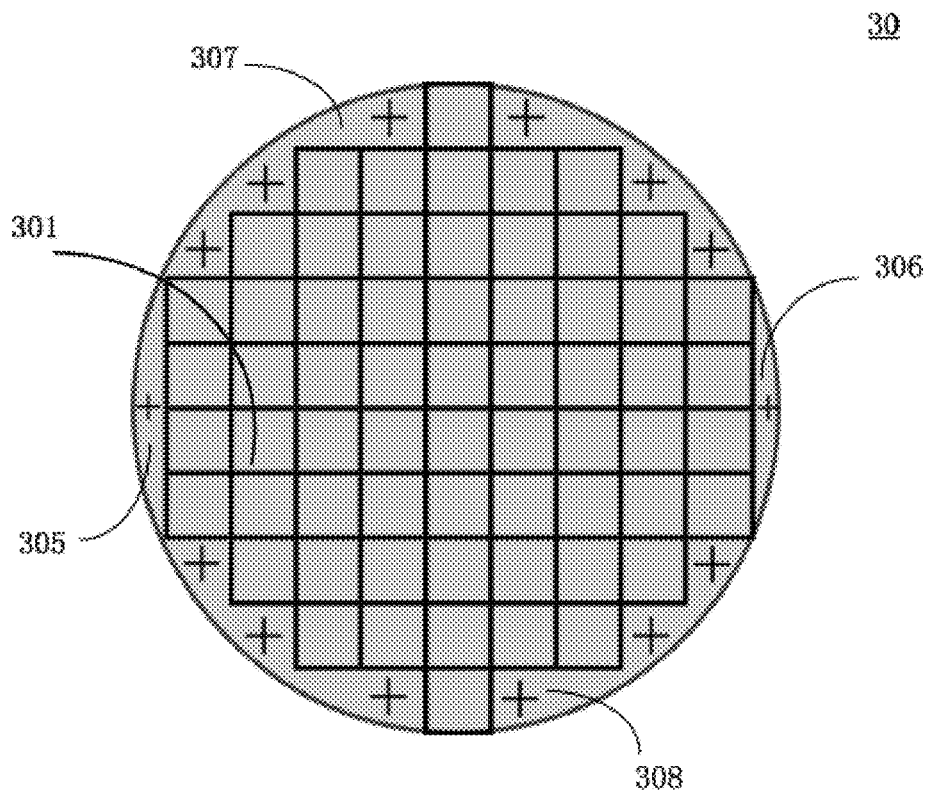
FIG. 3 is a schematic diagram of an image of a layer recovered from an edge distortion according to the present invention.

Referring to FIG. 2 and FIG. 3, FIG. 2 is a schematic structural diagram of an enhanced digital light processing-based mask projection stereolithography apparatus according to the present invention, and FIG. 3 is a schematic diagram of an image of a layer recovered from an edge distortion according to the present invention. The present invention provides an enhanced digital light processing-based mask projection stereolithography apparatus 20, comprising: a control platform 206 capable of slicing a model of a to-be-prototyped object into layers, converting a layer into a bitmap, and further dividing a corresponding image 30 of the layer into a main body area 301 and boundary filling areas 305, 306, 307, and 308; a digital light processing unit 203 that is controlled by the control platform 206 and capable of emitting a first light beam 208 used for the main body area 301 in a corresponding image 30 of the layer of the to-be-prototyped object; and a laser marking unit 205 that is controlled by the control platform 206 and capable of emitting a second light beam 209 used for the boundary filling areas 305, 306, 307, and 308 in the corresponding image 30 of the layer of the to-be-prototyped object. Preferably, prototyping the main body area 301 by the digital light processing unit 203 and prototyping the boundary filling areas 305, 306, 307, and 308 by the laser marking unit 205 are performed simultaneously.

In this embodiment, the apparatus 20 further comprises: a dichroic mirror 204, where the first light beam 208 emitted by the digital light processing unit 203 enters at an angle of 45 degrees to a first face of the dichroic mirror 204 and is reflected to a first specified processing position, and the second light beam 209 emitted by the laser marking unit 205 enters a second face of the dichroic mirror 204, penetrates the first face, and reaches a second specified processing position.

The dichroic mirror 204 may also be set to a different inclination angle. An angle at which the first light beam 208 emitted by the digital light processing unit 203 enters the first face of the dichroic mirror 204 also changes correspondingly as long as the first light beam 208 is reflected to the first specified processing position.

In another embodiment, alternatively, the second light beam 209 emitted by the laser marking unit 205 enters at an angle of 45 degrees to the first face of the dichroic mirror 204, and is then reflected to the second specified processing position; and the first light beam 208 emitted by the digital light processing unit 203 enters the second face of the dichroic mirror 204, penetrates the first face, and reaches the first specified processing position.

Regardless of the implementation manner, it may be implemented that an optical axis of the first light beam 208 emitted by the digital light processing unit 203 is coaxial with an optical axis of the second light beam 209 emitted by the laser marking unit 205, to ensure no deformation during prototyping of different areas of the object by using the two light beams.

The apparatus 20 further comprises a prototyping platform 201 and a liquid resin tank 202 defined on the prototyping platform 201, where the prototyping platform 201 comprises a platform body and a moving mechanism that is configured to drive the platform body to move along a vertical axis. Both the first specified processing position and the second specified processing position are located in the liquid resin tank 202, the first specified processing position is corresponding to the main body area, and the second specified processing position is corresponding to the boundary filling areas. As shown in FIG. 2, in this embodiment, both the first specified processing position and the second specified processing position are located on the bottom surface of the liquid resin tank 202, and the object is prototyped during a rising process of the prototyping platform 201.

In another embodiment, the liquid resin tank 202 may be alternatively defined below the digital light processing unit 203 and the laser marking unit 205, and the prototyping platform 201 is defined inside the resin liquid tank 202 in a direction that is reverse to that shown in FIG. 2. Both the first specified processing position and the second specified processing position are located on a top surface of the liquid resin tank 202, and the object is prototyped during a sinking process of the prototyping platform 201.

The laser marking unit 205 comprises a laser 2051, an XY scanner 2052, and a lens 2053. The second light beam 209 is formed after outgoing light from the laser 2051 passes through the XY scanner 2052 and then passes through the lens 2053. In this embodiment, the laser 2051 is an ultraviolet laser with a laser wavelength of 365 nm. The lens 2053 is an f-θ lens.

The digital light processing unit 203 is a DLP light machine having a wavelength of 405 nm. The wavelength is different from the laser wavelength emitted by the laser marking unit 205, so as to meet requirements of reflection and transparent transmission by the dichroic mirror 204.

In this embodiment, the control platform 206 is a computer running corresponding software. The control platform 206 is communicatively connected to the digital light processing unit 203 and the laser marking unit 205 by using a communications line 207. Specifically, the control platform 206 is connected to the digital light processing unit 203 by using a first cable 2071, the control platform 206 is connected to the laser 2051 by using a second cable 2072, and the control platform 206 is connected to the XY scanner 2052 by using a third cable 2073.

Figure 4:
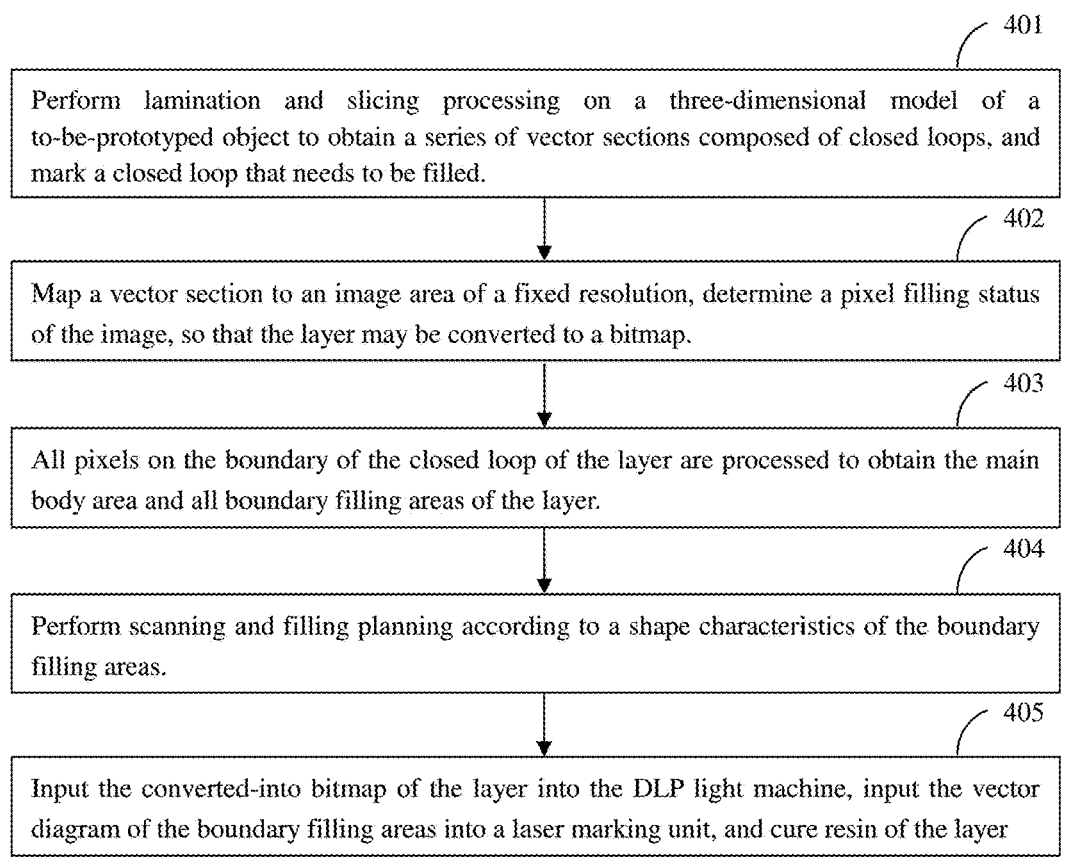
FIG. 4 is a schematic flowchart of an enhanced digital light processing-based mask projection stereolithography method according to the present invention.

Referring to FIG. 4, FIG. 4 is a schematic flowchart of an enhanced digital light processing-based mask projection stereolithography method according to the present invention. The method of the present invention generally comprises the following steps:

401. Perform lamination and slicing processing on a three-dimensional model of a to-be-prototyped object to obtain a series of vector sections composed of closed loops, determine a filling status of each closed loop by using a parity principle, and mark a closed loop that needs to be filled.

402. According to a projection resolution of a DLP light machine, determine a corresponding size of a pixel, map a vector section to an image area of a fixed resolution, namely, an image area corresponding to the resolution of the DLP light machine, and determine a pixel filling status of the image. Based on a method for determining a point inside or outside a polygon, a pixel filling status of a corresponding area is determined in an enclosed box of the to-be-filled closed loop: If a pixel of the area is inside the closed loop, the pixel is to be filled and marked as white; if a pixel is outside the closed loop, the pixel is not to be filled; and if a pixel intersects with a boundary of the closed loop, the pixel is not to be filled and both coordinates of the pixel and an intersecting point between the pixel and the boundary of the closed loop are recorded. After determining the pixel filling status is complete, the layer may be converted to a bitmap, that is, the pixels that are located outside the closed loop and intersect with the boundary of the closed loop are removed, and the other to-be-filled pixels inside the closed loop are converted into a bitmap. This part is a corresponding main body area of the layer.

403. Obtain a pixel part inside the closed loop of a pixel according to the recorded coordinates of the pixel and the intersecting point between the pixel and the boundary of the loop, where the pixel part is less than a size of one pixel and cannot be represented in the bitmap, and therefore is denoted as a to-be-filled area (which is an area with a mark "+" in FIG. 3). All pixels on the boundary of the closed loop of the layer are processed to obtain all boundary filling areas on the layer (which are a collection of all areas with marks "+" in FIG. 3). The boundary filling areas are not represented in the bitmap and remain in a vector diagram form.

404. Extract the boundary filling areas of the layer, and scan the areas in a horizontal or vertical scanning mode according to a shape characteristics of the boundary filling areas, to perform scanning and filling planning on the areas, that is, to fill the areas with lines. For example, the boundary areas 305 and 306 on the left and right sides in FIG. 3 must be filled in the vertical scanning mode, and the upper and lower boundary areas 307 and 308 should be filled in the horizontal scanning mode.

405. Input the converted-into bitmap of the layer into the DLP light machine, project, by using the light machine, the bitmap to a dichroic mirror for reflection, and perform exposure and curing on photosensitive resin in a liquid resin tank; simultaneously, input the vector diagram of the boundary filling areas into a laser marking unit, scan the boundary filling areas by using an XY scanner, and cure resin in the areas; and after curing the boundary filling areas is complete, scan contours of the boundary fill areas by using the XY scanner.

The higher the projection resolution of the DLP light machine, the smaller the corresponding size of the pixel. When the projection resolution of the DLP light machine is high enough to make the corresponding size of the pixel smaller than a spot of a second laser beam emitted by the laser marking unit, steps 404 and 405 may be further simplified and it only needs to scan the contours of the boundary fill areas by using the laser marking unit, with no need to perform scanning and filling planning. In this case, tracks that are formed along the contours of the boundary fill areas by the spot of the second laser beam may completely cover the boundary filling areas.

Compared with the prior art, in the enhanced digital light processing-based mask projection stereolithography method and apparatus in the present invention, a corresponding image 30 of a layer is divided into a main body area 301 and boundary filling areas 305, 306, 307, and 308; the DLP technology is combined with the laser marking technology; and the boundary filling areas 305, 306, 307, and 308 are prototyped by a laser marking unit 205 at the same time when the main body area 301 is prototyped by a DLP unit 203. Therefore, not only high-speed prototyping is implemented, but also an edge distortion is avoided, thereby improving precision of object prototyping.

It should be noted that the foregoing embodiments are merely intended for describing the technical solutions of the present invention, but not for limiting the present invention. Persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. An enhanced digital light processing-based mask projection stereolithography method, wherein comprising the following steps:

slicing a model of a to-be-prototyped object into layers, converting a layer into a bitmap, and further dividing the layer into a main body area and boundary filling areas;

prototyping, by using a digital light processing unit, the corresponding main body area of the layer of the to-be-prototyped object; and prototyping by using a laser marking unit, the corresponding boundary filling areas of the layer of the to-be-prototyped object;

wherein the steps of slicing the model of the to-be-prototyped object into layers, converting the layer into the bitmap, and further dividing the layer into the main body area and boundary filling areas comprises:

performing lamination and slicing processing on a three-dimensional model of the to-be-prototyped object to obtain a series of vector sections composed of closed loops;

mapping the vector sections to an image area of a corresponding resolution of the digital light processing unit, converting pixels located inside the closed loops into the bitmap, where the bitmap is defined as the main body area;

recording coordinates of a pixel intersecting with a boundary of the closed loops and intersecting points between the pixel and the boundary of the closed loops;

obtaining pixel parts inside the closed loops of a pixel according to the coordinates and the intersecting points, where each of the pixel parts is less than a size of one pixel, and the pixel parts are defined as the boundary filling areas; the boundary filling areas are remaining in a vector diagram form.

2. The method according to claim 1, wherein prototyping the main body area by the digital light processing unit and prototyping the boundary filling areas by the laser marking unit are performed simultaneously.

3. The method according to claim 1, wherein the prototyping the corresponding boundary filling areas of the layer of the to-be-prototyped object by the laser marking unit comprises: scanning filling lines inside the boundary filling areas and scanning contours of the boundary filling areas.

4. The method according to claim 1, wherein when a projection resolution of the digital light processing unit makes a corresponding size of the pixel smaller than a spot of the second light beam emitted by the laser marking unit, the prototyping of the corresponding boundary filling areas of the layer of the to-be-prototyped object by the laser marking unit merely refers to scanning contours of the boundary filling areas.

* * * * *